(12) United States Patent
Oomori (10) Patent No.: US 8,416,478 B2
(45) Date of Patent: Apr. 9, 2013

(54) IMAGE READING AND TRANSMITTING APPARATUS AND METHOD THAT GENERATES IMAGE CHECKING DATA FOR A READ IMAGE, AND COMPUTER-READABLE MEDIUM STORING A COMPUTER PROGRAM THEREFOR

(75) Inventor: Akira Oomori, Kanagawa (JP)

(73) Assignee: Canon Kabushiki Kaisha (JP)

( * ) Notice: Subject to any disclaimer, the term of this patent is extended or adjusted under 35 U.S.C. 154(b) by 987 days.

(21) Appl. No.: 10/844,815

(22) Filed: May 13, 2004

(65) Prior Publication Data

US 2004/0252338 A1 Dec. 16, 2004

(30) Foreign Application Priority Data

May 13, 2003 (JP) ................. 2003-134762

(51) Int. Cl.
*G03F 3/10* (2006.01)
*H04N 1/04* (2006.01)
*G06F 3/12* (2006.01)
*G06K 15/00* (2006.01)

(52) U.S. Cl.
USPC .......... 358/527; 358/1.15; 358/1.16; 358/474

(58) Field of Classification Search .................. 358/445, 358/1.13; 709/203
See application file for complete search history.

(56) References Cited

U.S. PATENT DOCUMENTS

| 6,002,496 | A  | * | 12/1999 | Weng ............................. 358/498 |
| 6,289,371 | B1 | * | 9/2001 | Kumpf et al. .................. 709/203 |
| 6,980,332 | B2 | * | 12/2005 | Simske ......................... 358/445 |
| 7,068,260 | B2 | * | 6/2006 | Hill ................................ 345/173 |
| 7,215,434 | B1 | * | 5/2007 | Janse et al. .................... 358/1.15 |
| 2002/0054383 | A1 | * | 5/2002 | Sato et al. ..................... 358/504 |
| 2002/0118386 | A1 | * | 8/2002 | Sakai ............................ 358/1.15 |
| 2003/0177448 | A1 | * | 9/2003 | Levine et al. ................. 715/530 |
| 2003/0231367 | A1 | * | 12/2003 | Quintana ...................... 358/527 |
| 2004/0076346 | A1 | * | 4/2004 | Russon ......................... 382/318 |

FOREIGN PATENT DOCUMENTS

| JP | 3-245677 | | 11/1991 |
| JP | 6-314327 | A | 11/1994 |
| JP | 9-102846 | | 4/1997 |

* cited by examiner

*Primary Examiner* — Vincent Rudolph
(74) *Attorney, Agent, or Firm* — Rossi, Kimms & McDowell LLP (57) ABSTRACT

An image reading and transmitting apparatus which is capable of permitting quick checking of image data read and stored and quickly transmitting the image data after the checking. An image reader 107 reads an image, an input device 104 receives an instruction to check the data of the image read by the image reader 107, and a central processing unit (CPU) 101 generates image checking data based on the data of the image read by the image reader 107, irrespective of whether the instruction has been received or not by the input device 104.

18 Claims, 7 Drawing Sheets

IMAGE READING AND TRANSMITTING APPARATUS AND METHOD THAT GENERATES IMAGE CHECKING DATA FOR A READ IMAGE, AND COMPUTER-READABLE MEDIUM STORING A COMPUTER PROGRAM THEREFOR

BACKGROUND OF THE INVENTION

1. Field of the Invention

The present invention relates to an image reading and transmitting apparatus, an image checking data generating method, and a program for controlling the method, and more particularly to an image reading and transmitting apparatus provided with functions for reading images and transmitting the images to other devices or apparatuses, such as a copier, a fax, a scanner, an image checking data generating method applied to the image reading and transmitting apparatus, and a program for causing a computer to execute the image checking data generating method.

2. Description of the Related Art

Conventional image reading and transmitting apparatuses that read images and transmit the read images to other devices or apparatuses are adapted to permit checking the read image before transmitting if it is desired to do so. A first prior art apparatus carries out conversion processing on the read image data such as resolution conversion, image layout conversion, color conversion, in order to tailor the read image to the capabilities of a display, such as resolution, image layout, color reproducibility, and then transfers the converted image data to the display, to thereby permit checking (e.g. Japanese Laid-Open Patent Publication (Kokai) No. H03-245677).

Furthermore, a second prior art apparatus carries out reading an image twice, to generate an image suited to the capabilities of a display by the first reading, and generate image data for transmission by the second reading (e.g. Japanese Laid-Open Patent Publication (Kokai) No. H09-102846).

Also in the case where the read image data is transmitted to a storage device and stored therein, the first prior art apparatus is applied to display the stored image data for checking at a later time.

However, as stated above, to generate image checking data with the first prior art apparatus based on the image data stored in the storage device, the time-consuming image conversion processing is involved at the time of checking, thus requiring an undesired waiting time before the user checks the image checking data. Thus, there is a desire to eliminate the waiting time.

In the second prior art apparatus as well, the time-consuming reading processing must be performed twice before the read image data is transmitted to another device or apparatus after checking, thus entailing a long time period before the transmission processing is complete.

SUMMARY OF THE INVENTION

It is an object of the present invention to provide an image reading and transmitting apparatus, an image checking data generating method, and a program for implementing the method, which are capable of permitting quick checking of image data read and stored and quickly transmitting the image data after the checking.

To attain the above object, in a first aspect of the present invention, there is provided an image reading and transmitting apparatus comprising an image reading device that reads an image, a receiving device that receives an instruction to check data of the image read by the image reading device, and a generating device that generates image checking data based on data of the image read by the image reading device, irrespective of whether the instruction has been received or not by the receiving device.

Preferably, the image reading and transmitting apparatus further comprises a display device, a display control device that causes the display device to display the image checking data generated by the generating device when the instruction has been received by the receiving device.

Also preferably, the image reading and transmitting apparatus further comprises a storage device, a designation accepting device that accepts a designation of an apparatus to which the data of the image read by the image reading device is to be transmitted, and a storing device that stores the data of the image read by the image reading device and the image checking data generated by the generating device in the storage device when the designation accepted by the designation accepting device designates the storage device.

More preferably, the image reading and transmitting apparatus further comprises a transmitting device that transmits the data of the image read by the image reading device to a predetermined device or apparatus other than the storage device when the designation accepted by the designation accepting device does not designate the storage device, but designates the predetermined device or apparatus.

Still more preferably, the image reading and transmitting apparatus further comprises a stopping device that stops operation of the generating device when the designation accepted by the designation accepting device does not designate the storage device, but designates the predetermined device or apparatus.

Preferably, the image reading and transmitting apparatus further comprises a designation accepting device that accepts a designation of an apparatus to which the data of the image read by the image reading device is to be transmitted, and a first transmitting device that transmits the data of the image read by the image reading device and the image checking data generated by the generating device to a database server connected to the image reading and transmitting apparatus, when the designation accepted by the designation accepting device designates the database server.

More preferably, the image reading and transmitting apparatus further comprises a second transmitting device that transmits the data of the image read by the image reading device to a predetermined device or apparatus other than the database server when the designation accepted by the designation device does not designate the database server, but designates the predetermined device or apparatus.

Still more preferably, the image reading and transmitting apparatus further comprises a stopping device that stops operation of the generating device when the designation accepted by the designation accepting device does not designate the database server, but designates the predetermined device or apparatus.

Preferably, the image reading and transmitting apparatus further comprises a storage device, a designation accepting device that accepts a designation of an apparatus to which the data of the image read by the image reading device is to be transmitted, and a storing/transmitting device that stores and transmits the data of the image read by the image reading device and the image checking data generated by the generating device, in the storage device and to a database server connected to the image reading and transmitting apparatus, when the designation accepted by the designation accepting device designates the storage device and the database server.

More preferably, the image reading and transmitting apparatus further comprises a transmitting device that transmits the data of the image read by the image reading device to a predetermined device or apparatus other than the storage device and the database server, when the designation accepted by the designation accepting device does not designate the storage device and the database server, but designates the predetermined device or apparatus.

Still more preferably, the image reading and transmitting apparatus further comprises a stopping device that stops operation of the generating device when the designation accepted by the designation accepting device does not designate the storage device and the database server, but designates the predetermined device or apparatus.

According to the first aspect of the present invention, the image checking data is generated based on the data of the read image, and then stored e.g. in a storage device of the image reading and transmitting apparatus, irrespective of whether an instruction to check data of the read image has been received or not. As a result, by reading the image checking data from the storage device and displaying these data on the display device upon request to display these data for checking, which is given later, the image checking data can be quickly displayed on the display device and hence the image data for transmission can be quickly checked.

Further, by reading the data of the image from the storage device and transmitting these data to a predetermined device or apparatus upon request to transmit these data after the checking, the image data can be quickly transmitted after the checking.

To attain the above object, in a second aspect of the present invention, there is provided an image checking data generating method applied to an image reading and transmitting apparatus comprising an image reading step of reading an image, a receiving step of receiving an instruction to check data of the image read in the image reading step, and a generating step of generating image checking data based on the data of the image read in the image reading step, irrespective of whether the instruction has been received or not in the receiving step.

Preferably, the image checking data generating method further comprises a display control step of displaying the image checking data generated in the generating step on a display device when the instruction has been received in the receiving step.

Also preferably, the image checking data generating method further comprises a designation accepting step of accepting a designation of an apparatus to which the data of the image read in the image reading step is to be transmitted, and a storing step of storing the data of the image read in the image reading step and the image checking data generated in the generating step when the designation accepted in the designation accepting step designates a storage device incorporated in the image reading and transmitting apparatus.

More preferably, the image checking data generating method further comprises a transmitting step of transmitting the data of the image read in the image reading step to a predetermined device or apparatus other than the storage device when the designation accepted in the designation accepting step does not designate the storage device, but designates the predetermined device or apparatus.

Still more preferably, the image checking data generating method further comprises a stopping step of stopping operation of the generating step when the designation accepted in the designation accepting step does not designate the storage device, but designates the predetermined device or apparatus.

To attain the above object, in a third aspect of the present invention, there is provided a program for causing a computer to execute a image checking data generating method applied to an image reading and transmitting apparatus comprising an image reading module for reading an image, a receiving module for receiving an instruction to check data of the image read by the image reading module, and a generating module for generating image checking data based on the data of the image read by the image reading module, irrespective of whether the instruction has been received or not by the receiving module.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
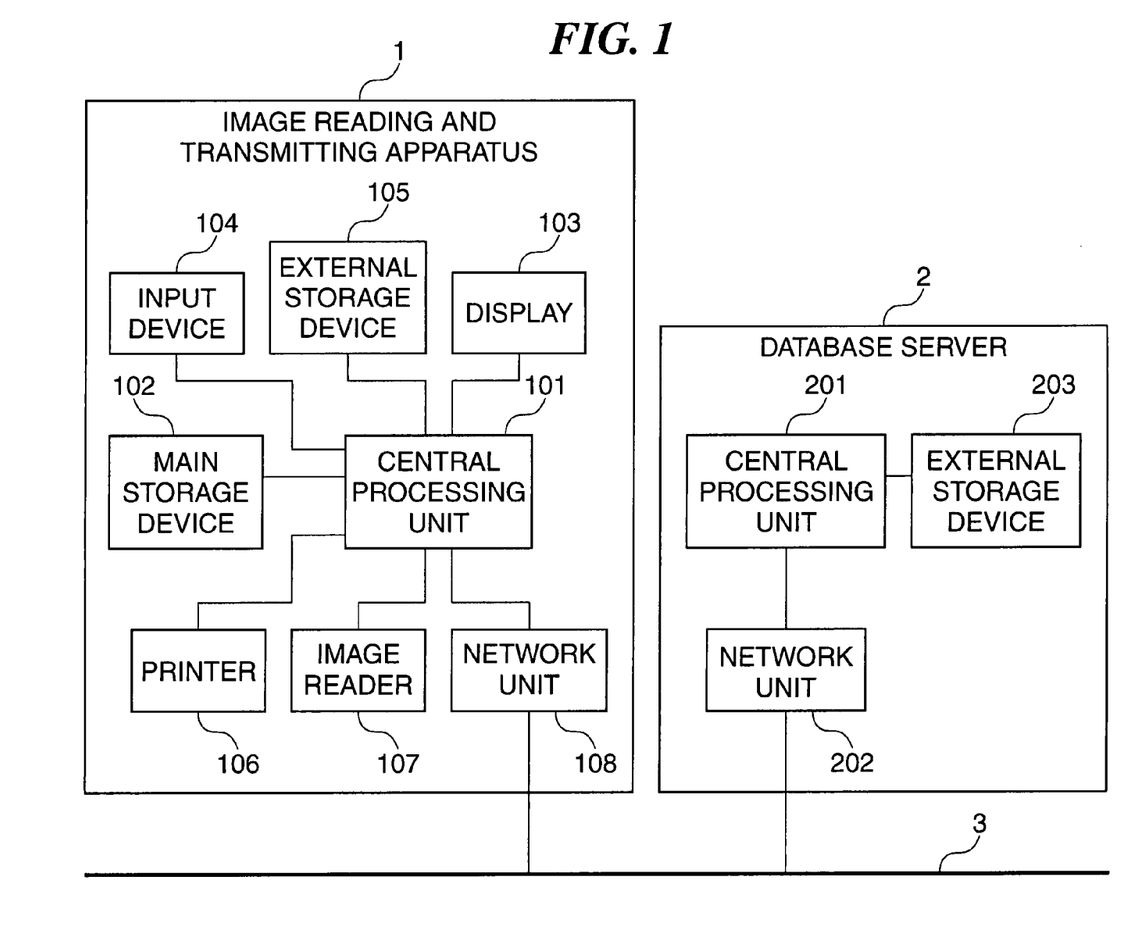
FIG. 1 is a block diagram showing the configuration of a network system including an image reading and transmitting apparatus according to a first embodiment of the present invention.

FIG. 1 is a block diagram showing the configuration of a network system including an image reading and transmitting apparatus according to a first embodiment of the present invention.

The network system is comprised of an image reading and transmitting apparatus 1 and a database server 2 which are interconnected via a network 3.

The image reading and transmitting apparatus 1 is a multi-function apparatus having a copy function and a facsimile function and is mainly comprised of a central processing unit (CPU) 101, a main storage device 102, a display 103, an input device 104, an external storage device 105, a printer 106, an image reader 107, and a network unit 108.

The CPU 101 controls the main storage device 102, the display 103, the input device 104, the external storage device 105, the printer 106, the image reader 107, and the network unit 108, and also performs arithmetical and logical operations.

The main storage device 102 stores information necessary for the image reading and transmitting apparatus 1 to perform information processing. The stored information is read whenever necessary.

The display 103 displays graphics, characters, etc. resulting from the information processing performed by the apparatus 1, and is implemented by a touch panel display.

The input device 104 inputs various signals to the CPU 101, and includes a keyboard and a touch panel.

The external storage device 105 stores various information, and is implemented by a magnetic storage device, a magneto-optical storage device or the like. This external storage device 105 stores image data read by the image reader 107.

The database server 2 is mainly comprised of a CPU 201, a network unit 202, and an external storage device 203. The database server 2 stores and manages groups of image page data as documents, and stores and manages image checking display data corresponding to image page data of each document. According to a request to retrieve a document from one of client terminals, including the image reading and transmitting apparatus 1, which are connected to the network 3, either image page data or image checking display data is downloaded for the client terminal.

The image reading and transmitting apparatus 1 connected to the database server 2 via the network 3 can register a group of image page data read by the apparatus 1, in the database server 2 as a document.

The network 3 includes Ethernet (registered trademark) USB (Universal Serial Bus). The image reading and transmitting apparatus 1 and the database server 2 may be connected to each other through serial connection or parallel connection.

Figure 2:
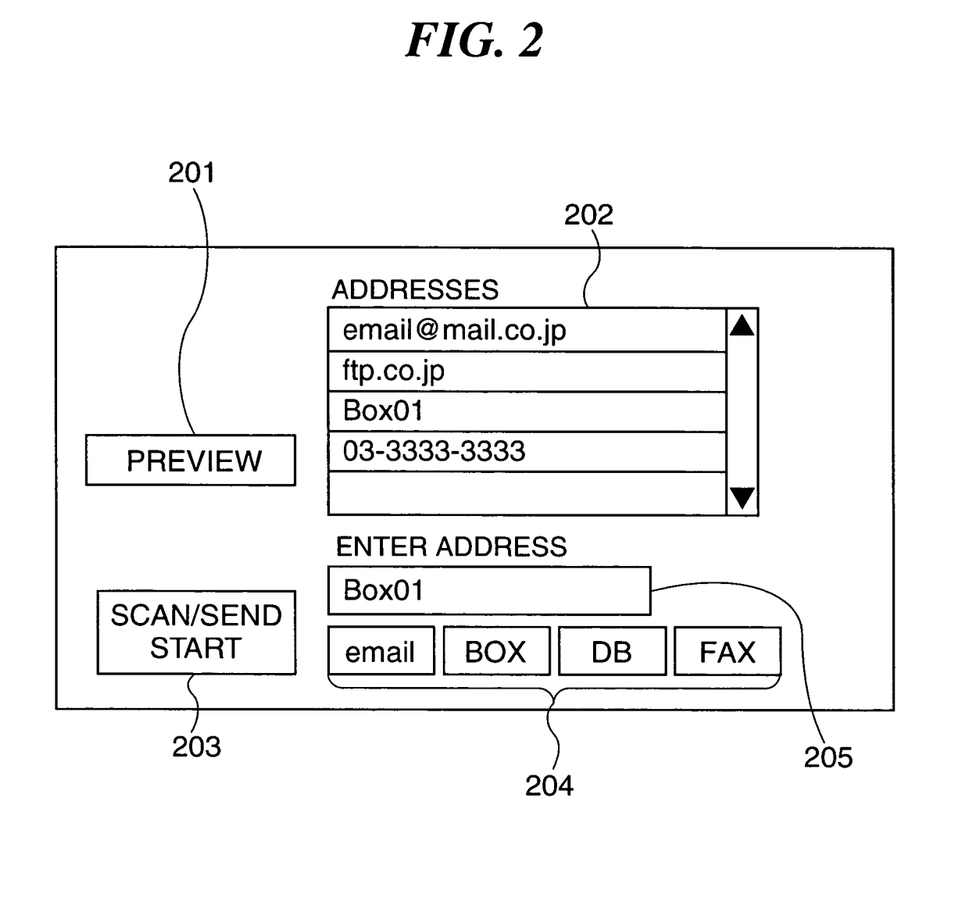
FIG. 2 is a view showing an instruction input screen displayed on a display of the image reading and transmitting apparatus.

Displayed on the display 103 of the image reading and transmitting apparatus 1 is an instruction input screen through which an operator gives instructions to read, display for checking, store, and transmit images.

FIG. 2 is a view showing the instruction input screen displayed on the display 103 of the image reading and transmitting apparatus 1. The display 103 is implemented by a touch panel display, as mentioned above.

When a preview instruction button 201 is pressed on the instruction input screen, image display is carried out which enables the operator to view and check an image already read. An address input field 205 displays a string of characters entered via the input device 104. When any of address type selection buttons 204 is pressed, the character string entered and displayed in the address input field 205 is additionally displayed in an address field 202 as an address of the type indicated by the button pressed. An address "email@mail.co.jp" displayed as an example in the address field 202 is the electronic mail address of a destination set by pressing a button "email". Similarly, an address "ftp.co.jp" is the MAC address of the database server 2 set by pressing a button "DB", and an address "03-3333-3333" is the fax number of a destination set by pressing a button "FAX" (a button "BOX" will be described later).

When a scan/send start button 203 is pressed, the image reader 107 carries out scanning an image. The scanned image data is stored in the external storage device 105, and the stored image data is transmitted to an address indicated in the address field 202. Note that the image checking display data is generated based on the image data, and stored, as necessary, details of which will be described later with reference to FIGS. 4A and 4B.

The external storage device 105 of the image reading and transmitting apparatus 1 includes a temporary image data storage area, and a plurality of Box storage areas. Each of the Box storage areas has an identifier "Box+a number" assigned thereto. By entering such an identifier to the address input field 205 and then pressing the button "BOX", which is one of the address type selection buttons 204, the identifier is set in the address field 202 to indicate as an address a corresponding one of the Box storage areas in the external storage device 105. An address "Box01" shown as an example in the address field 202 is the identifier of one of the Box storage areas in the external storage device 105.

In each Box storage area of the external storage device 105, image data read by the image reader 107, and image checking display data generated based on the read image data are stored. The image checking display data can be viewed on the display 103 at any time until it is deleted in response to an instruction from the operator. Similarly, the image data can be printed by the printer 106 at any time until it is deleted in response to an instruction from the operator.

Figure 3:
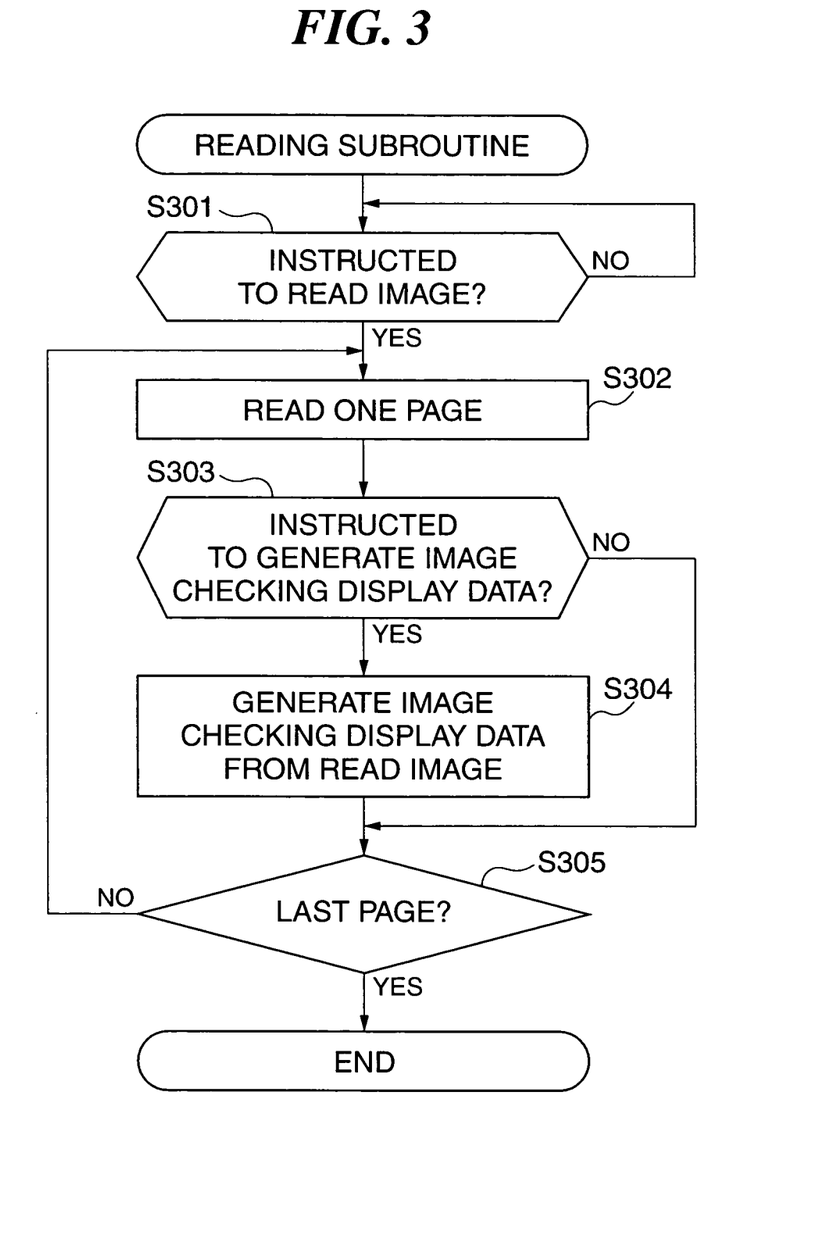
FIG. 3 is a flowchart showing a procedure for reading an image and generating data for checking the read image executed by the image reading and transmitting apparatus.

FIG. 3 is a flowchart showing a procedure for reading an image and generating image checking display data executed by the image reading and transmitting apparatus 1.

In a step S301, it is determined whether or not an instruction has been inputted to read an image. If the instruction has been inputted, the process proceeds to a step S302, and if the instruction has not been inputted, the process repeats the step S301.

In the step S302, the image reader 107 reads one page of image data. Then, in a step S303, it is determined whether or not an instruction has been given to generate image checking display data (which will be described later with reference to FIGS. 4A and 4B). If the instruction has been given, the process proceeds to a step S304, and if the instruction has not been given, the process skips over the step S304 to a step S305. In the step S304, image checking display data is generated based on the page of the image read in the step S302. That is, a set of conversion processes is performed, which involves resolution conversion, image layout conversion, color conversion, etc. in order to tailor the read image to the capabilities of the display 103.

In the step S305, it is determined whether or not the image reader 107 has read image data up to the last page. If the image reader 107 has not read image data up to the last page, the process returns to the step S302 to read the remaining page or pages. If the image reader 107 has read image data up to the last page, the process is terminated.

Figure 4A:
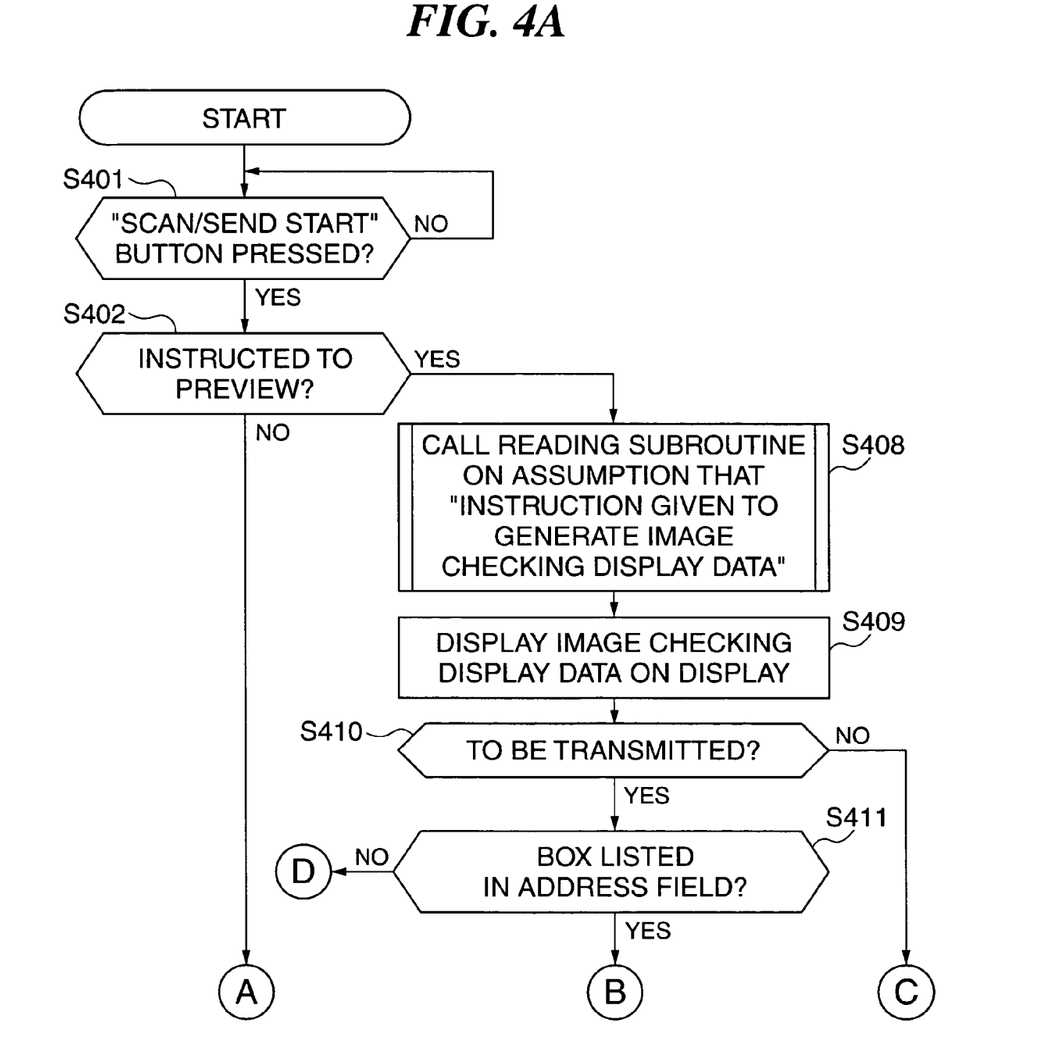
FIGS. 4A and 4B are flowchart showing a procedure for reading, displaying for checking, storing, and transmitting an image executed by the image reading and transmitting apparatus according to instructions inputted to the instruction input screen.
Figure 4B:
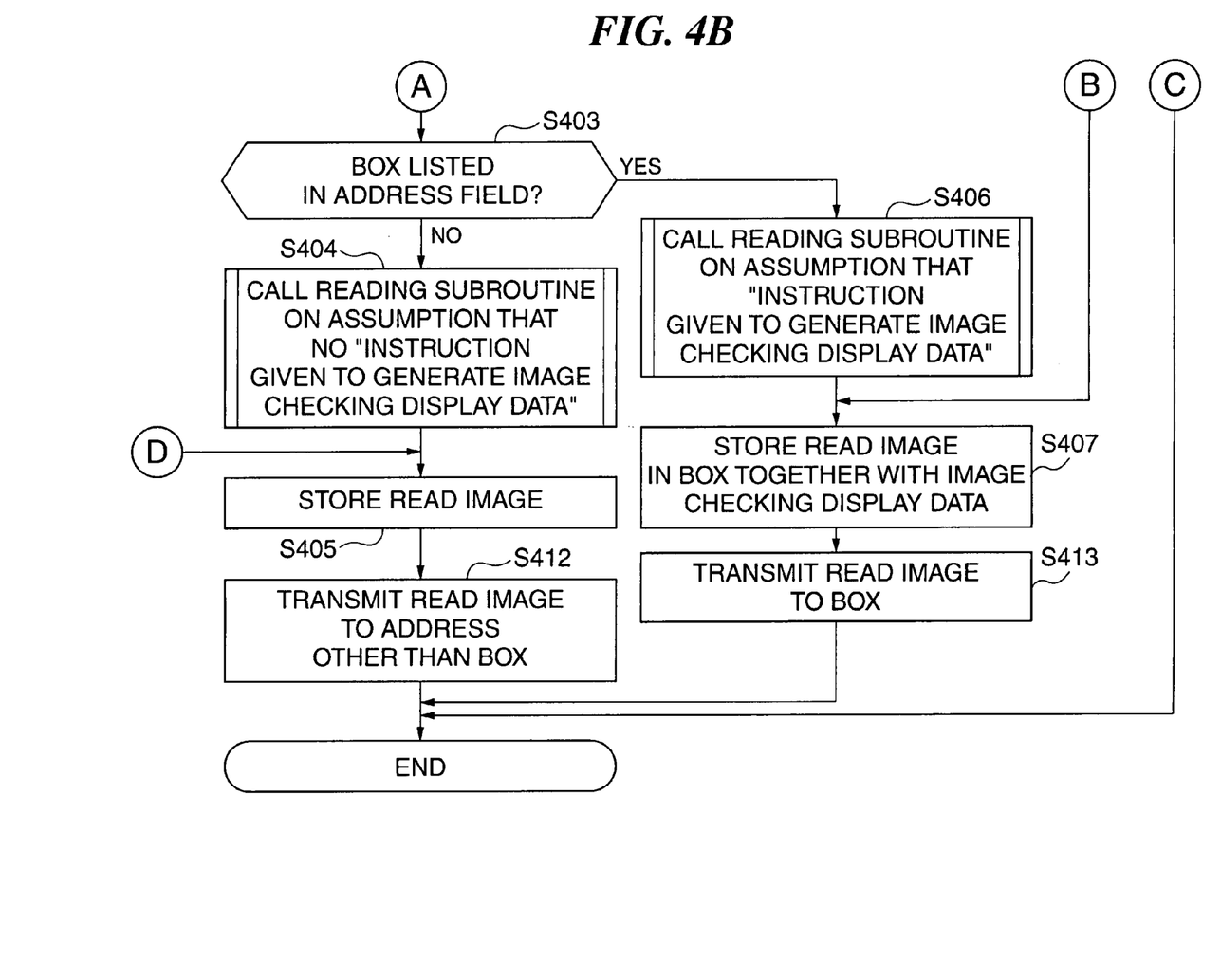

FIGS. 4A and 4B are flowchart showing a procedure for reading, checking, storing, and transmitting an image executed by the image reading and transmitting apparatus 1 according to instructions inputted to the instruction input screen.

In a step S401, it is determined whether or not the scan/send start button 203 on the instruction input screen of FIG. 2 has been pressed. If the button 203 has been pressed, the process proceeds to a step S402. If the button 203 has not been pressed, the process returns to the step S401 to wait until the button 203 is pressed.

Next, in the step S402, it is determined whether or not the preview instruction button 201 of FIG. 2 has been pressed. If the button 201 has been pressed, the process proceeds to a step S408. If the button 201 has not been pressed, the process proceeds to a step S403, where it is determined whether or not the identifier of a Box storage area in the external storage device 105 is contained in the address field 202. If the identifier is contained, the process proceeds to a step S406, and if the identifier is not contained, the process proceeds to a step S404.

In the step S404, the process shown in FIG. 3 is performed on the assumption that no instruction has been inputted to generate image checking display data (NO to the step S303), whereby only image data for transmission is generated, and then, in a step S405, the image data for transmission generated in the step S404 is stored in the temporary image data storage area of the external storage device 105.

In the step S406, the process shown in FIG. 3 is performed on the assumption that an instruction has been inputted to generate image checking display data (YES to the step S303), whereby both image data for transmission and its image checking display data are generated. And then, in a step S407, the image data for transmission is stored, along with the image checking display data, in the Box storage area of the external storage device 105 to which is assigned the identifier inputted in the address field 202. By thus storing, in the step S407, the image data for transmission in the Box storage area of the device 105 together with its image checking display data, the operator can read the image data for transmission and the image checking display data from the Box storage area of the external storage device 105 for transmitting the image data for transmission to different addresses and checking or previewing the image through the image checking display data as many times as the operator wishes, unless the image data for transmission and the image checking display data are deleted. Also, since the image checking display data is generated and stored in the Box storage area of the external storage device 105, even when the operator has not instructed to check the image data for transmission, the operator can check the image data for transmission instantly, if he/she wants to do so later. Therefore, the operator is free from stress derived from an otherwise entailed waiting time before generation of the image checking display data, and hence operability is greatly improved.

In the step S408, the process shown in FIG. 3 is performed on the assumption that the instruction has been inputted to generate image checking display data (YES to the step S303), whereby both image data for transmission and its image checking display data are generated. Then, in a step S409, a preview image based on the image checking display data is displayed on the display 103. As a result, the operator can check how the image looks like before transmitting the image data.

In a step S410, the operator determines whether to send the image data for transmission or not after the checking, and the process proceeds to a step S411 according to an instruction from the operation if the image data for transmission is to be transmitted, or the process is terminated if the image data is not to be transmitted.

In the step S411, similarly to the step S403, it is determined whether or not the identifier of a Box storage area in the external storage device 105 is contained in the address field 202. If the identifier is contained, the process proceeds to the step S407, and if the identifier is not contained, the process proceeds to the step S405.

In a step S412, only the image data for transmission is read from the temporary image data storage area or the Box storage area of the external storage device 105 and transmitted to an address other than the address represented by the identifier of the Box storage area contained in the field 202. The process is then terminated.

On the other hand, in a step S413, the image data for transmission stored in the Box storage area of the external storage device 105 in the step S407 is transmitted to the address represented by the identifier of the Box storage area, and then the process is terminated.

As descried above, according to the first embodiment, even when the instruction for checking the read image data has been given (NO to the step S402), if the identifier of a Box storage area in the external storage device 105 is contained in the address field 202(YES to the step S403), image data for transmission and its image checking display data are generated (step S406), and the image data for transmission is stored along with the image checking display data in the Box storage area of the external storage device 105 to which is assigned the identifier inputted in the address field 202 (step S407). As a result, by reading the image checking display data from the Box storage area of the external storage device 105 and displaying these data on the display device 103 upon request to display these data for checking, which is given later, the image checking display data can be quickly displayed on the display device 103 and hence the image data for transmission can be quickly checked.

Next, a second embodiment of the present invention will be described.

The second embodiment has basically the same hardware configuration as that of the first embodiment, and thus the hardware configuration of the first embodiment described above will be referred to in the description of the second embodiment.

In the second embodiment, the procedure for reading, checking, storing, and transmitting an image executed by the image reading and transmitting apparatus 1 differs from that of the first embodiment shown in FIGS. 4A and 4B.

Figure 5A:
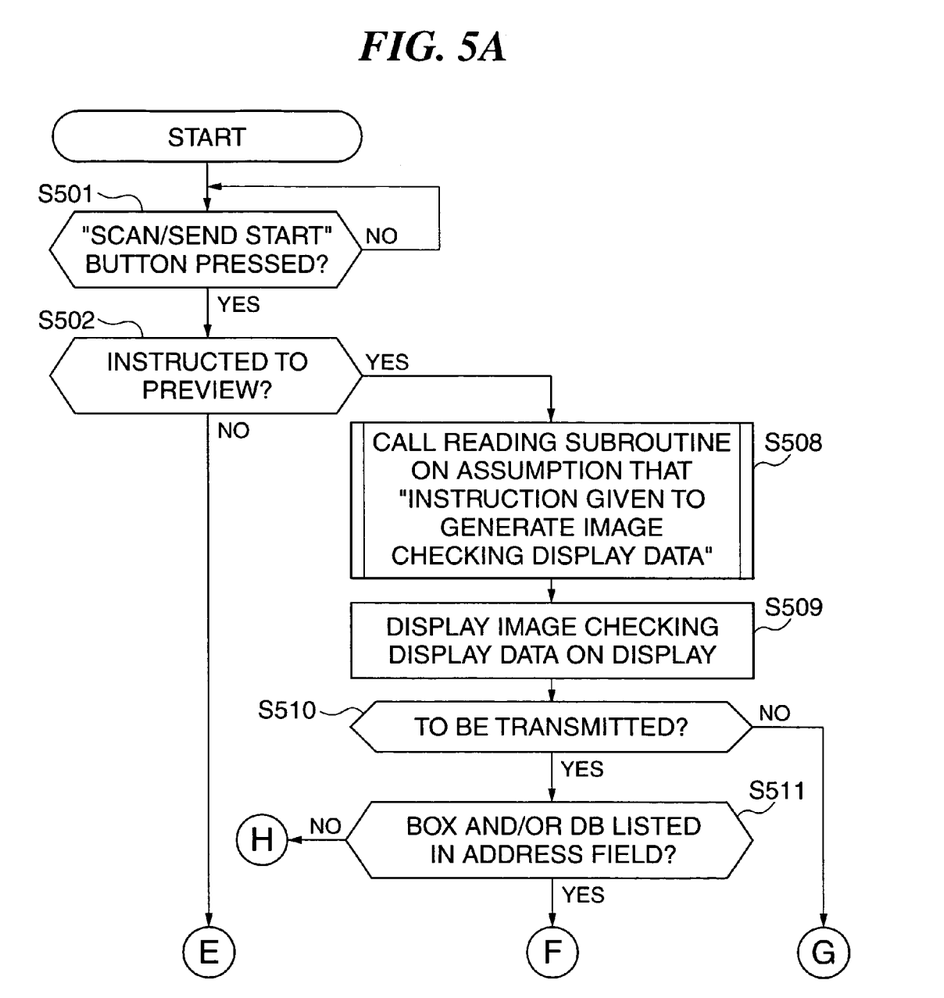
FIGS. 5A and 5B are flowchart showing a procedure for reading, displaying for checking, storing, and transmitting an image executed by the image reading and transmitting apparatus according to a second embodiment of the present invention, according to instructions inputted to the instruction input screen.
Figure 5B:
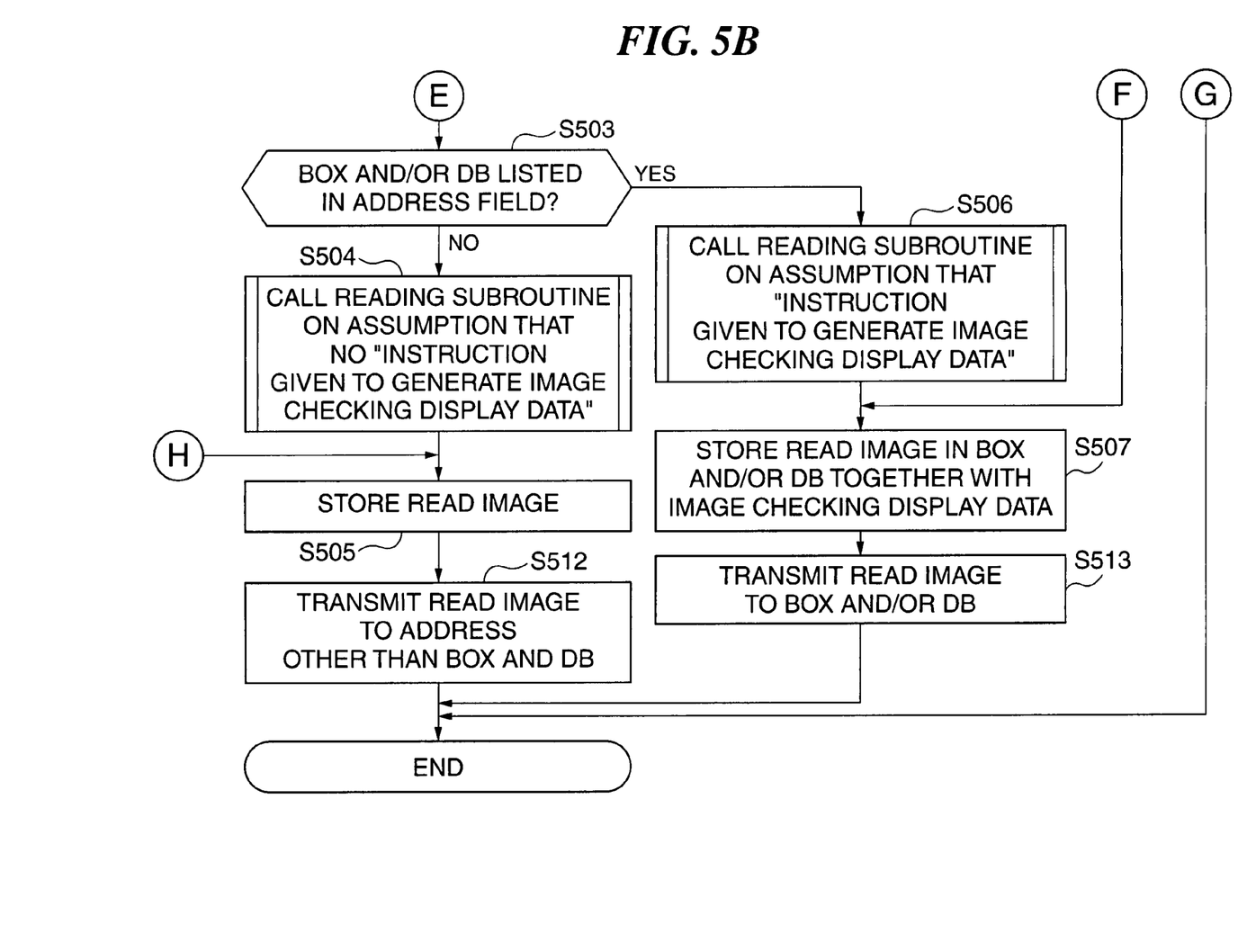

FIGS. 5A and 5B are flowchart showing a procedure for reading, checking, storing, and transmitting an image executed by the image reading and transmitting apparatus 1 according to the second embodiment, according to instructions inputted to the instruction input screen.

In a step S501, it is determined whether or not the scan/send start button 203 on the image input screen of FIG. 2 has been pressed. If the button 203 has been pressed, the process proceeds to a step S502. If the button 203 has not been pressed, the process returns to the step S501 to wait for the button 203 to be pressed.

Then, in the step S502, it is determined whether or not the preview instruction button 201 in FIG. 2 has been pressed. If the button 201 has been pressed, the process proceeds to a step S508, and if the button 201 has not been pressed, the process proceeds to a step S503, where it is determined whether or not the identifier of a Box storage area in the external storage device 105 or the MAC address of the database server 2 set by pressing the button "DB" is contained in the address field 202. If at least one of the identifier and the MAC address is contained, the process proceeds to a step 8506. If neither of them is contained, the process proceeds to a step S504.

In the step S504, the process shown in FIG. 3 is performed on the assumption that no instruction has been inputted to generate image checking display data (NO to the step S303), whereby only image data for transmission is generated, and then, in a step S505, the image data generated in the step S504 is stored in the temporary image data storage area of the external storage device 105.

In the step S506, the process shown in FIG. 3 is performed with the assumption that an instruction has been inputted to generate image checking display data (YES to the step S303), whereby both image data for transmission and its image checking display data are generated. And then, in a step S507, the image data for transmission and the image checking display data are stored in the Box storage area of the external storage device 105 to which is assigned an identifier if the identifier is contained in the address field 202, or transmitted to the database server 2 corresponding to a MAC address if the MAC address is contained in the field 202. If both the identifier and the MAC address are contained in the address field 202, the above two data are stored in the Box storage area corresponding to the identifier and the database server corresponding to the MAC address. By thus storing, in the step S507, the image data for transmission in the Box storage area of the external storage device 105 and/or the database server 2 together with its image checking display data, the operator can read the image data for transmission from the Box storage area of the external storage device 105 or from the database server 2, for transmitting the image data for transmission to different addresses and checking or previewing the image through the image checking display data as many times as the operator wishes, unless the image data for transmission and the image checking display data are deleted. Also, since the image checking display data is generated and stored in the Box storage area of the external storage device 105 and the database server 2, even when the operator has not instructed to check the image data for transmission, the operator can check the image data for transmission instantly, if he/she wants to do so later. Therefore, the operator is free from stress derived from an otherwise entailed waiting time before generation of the image checking display data, and hence operability is greatly improved.

In the step S508, the process shown in FIG. 3 is performed on the assumption that the instruction has been inputted to generate image checking display data (YES to step S303), whereby both image data for transmission and its image checking display data are generated. Then, in a step S509, a preview image based on the image checking display data is displayed on the display 103. As a result, the operator can how the image looks like before transmitting the image data for transmission.

In a step S510, the operator determines whether to send the image data for transmission or not after the checking, and the process proceeds to a step S511 according to an instruction from the operator if the image data for transmission is to be transmitted, or the process is terminated if the image data is not to be transmitted.

In a step S511, similarly to the step S503, it is determined whether or not the identifier of the Box storage area in the external storage device 105 and/or the MAC address of the database server 2 is contained in the address field 202, and if at least one of the identifier and the MAC address is contained, the process proceeds to the step S507, and if neither of the identifier and the MAC address is contained, the process proceeds to the step S505.

In a step S512, only the image data for transmission is read from the temporary image data storage area or the Box storage area of the external storage device 105 and transmitted to an address other than the address represented by the identifier and the MAC address contained in the field 202, and then the process is terminated.

On the other hand, in a step S513, the image data for transmission stored in the Box storage area of the external storage device 105 in the step S507 is transmitted to the address represented by the identifier of the Box storage area, and then the process is terminated.

As descried above, according to the second embodiment, even when the instruction for checking the read image data has been given (NO to the step S502), if the identifier of a Box storage area in the external storage device 105 is contained in the address field 202(YES to the step S503), image data for transmission and its image checking display data are generated (step S506), and the image data for transmission is stored along with the image checking display data in the Box storage area of the external storage device 105 to which is assigned the identifier inputted in the address field 202 and the database server 2 (step S507). As a result, by reading the image checking display data from the Box storage area of the external storage device 105 or the database server 2 and displaying these data on the display device 103 upon request to display these data for checking, which is given later, given later, the image checking display data can be quickly displayed on the display device 103 and hence the image data for transmission can be quickly checked.

It is to be understood that the object of the present invention may also be achieved by supplying a system or an apparatus with a storage medium in which a program code of software which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the embodiments described above, and hence the storage medium in which the program code is stored constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded by downloading from another computer, a database, or the like, not shown, connected to the Internet, a commercial network, a local area network, or the like.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. An image reading apparatus comprising:
    an image reading unit configured to read an image and generate data of the image;
    a receiving unit configured to receive an instruction for previewing the image read by said image reading unit;
    a determining unit configured to determine whether a destination of the data of the image generated by said image reading unit includes a predetermined storage of the image reading apparatus; and
    a control unit configured to:
        generate a preview image based on the data of the image generated by said image reading unit in a case where the instruction has been received by said receiving unit, the preview image allowing an operator to preview the image read by said image reading unit;
        generate the preview image without receiving the instruction based on the data of the image generated by said image reading unit to display the preview image in accordance with the instruction received after generating the preview image, in a case where the instruction has not been received by said receiving unit and said determining unit determines that the destination includes the predetermined storage, the preview image being stored in the predetermined storage of the image reading apparatus and allowing an operator to preview the image read by said image reading unit; and
        not generate the preview image in a case where the instruction has not been received by said receiving unit and said determining unit determines that the destination does not include the predetermined storage.

2. An image reading apparatus according to claim 1, further comprising:
a display unit;
a display control unit configured to cause said display unit to display the preview image generated by said control unit in accordance with the instruction received after generating the preview image.

3. An image reading apparatus according to claim 1, further comprising:
a storage unit corresponding to the predetermined storage;
a designation accepting unit configured to accept a designation of the data of the image generated by said image reading unit; and
a storage controlling unit configured to store the data of the image generated by said image reading unit and the preview image generated by said control unit in said storage unit in a case where the designation accepted by said designation accepting unit includes a designation of said storage unit.

4. An image reading apparatus according to claim 3, further comprising:
a transmitting unit configured to transmit the data of the image generated by said image reading unit to a predetermined apparatus other than said storage unit in a case where the designation accepted by said designation accepting unit does not include the designation of said storage unit, but includes a designation of the predetermined apparatus.

5. An image reading apparatus according to claim 4, further comprising:
a stopping unit configured to stop operation of said control unit in a case where the designation accepted by said designation accepting unit does not include the designation of said storage unit, but includes the designation of the predetermined apparatus.

6. An image reading apparatus according to claim 1, further comprising:
a designation accepting unit configured to accept a designation of the data of the image generated by said image reading unit; and
a first transmitting unit configured to transmit the data of the image generated by said image reading unit and the preview image generated by said control unit to a database server connected to the image reading apparatus, in a case where the designation accepted by said designation accepting unit includes a designation of the database server.

7. An image reading apparatus according to claim 6, further comprising:
a second transmitting unit configured to transmit the data of the image generated by said image reading unit to a predetermined apparatus other than the database server in a case where the designation accepted by said designation unit does not include the designation of the database server, but includes a designation of the predetermined apparatus.

8. An image reading apparatus according to claim 7, further comprising:
a stopping unit configured to stop operation of said control unit in a case where the designation accepted by said designation accepting unit does not include the designation of the database server, but includes the designation of the predetermined apparatus.

9. An image reading apparatus according to claim 1, further comprising:
a storage unit;
a designation accepting unit configured to accept a designation of an apparatus of the data of the image generated by said image reading unit; and
a storing/transmitting unit configured to store and transmit the data of the image generated by said image reading unit and the preview image generated by said control unit, in said storage unit and to a database server connected to the image reading apparatus, in a case where the designation accepted by said designation accepting unit includes designations of said storage unit and the database server.

10. An image reading apparatus according to claim 9, further comprising:
a transmitting unit configured to transmit the data of the image generated by said image reading unit to a predetermined apparatus other than said storage unit and the database server, in a case where the designation accepted by said designation accepting unit does not include the designations of said storage unit and the database server, but includes the designation of the predetermined apparatus.

11. An image reading apparatus according to claim 10, further comprising:
a stopping unit configured to stop operation of said control unit in a case where the designation accepted by said designation accepting unit does not include the designations of said storage unit and the database server, but includes the designation of the predetermined apparatus.

12. A method of controlling an image reading apparatus, the method comprising:
an image reading step of reading an image and generating data of the image with an image reading unit;
a receiving step of receiving an instruction for previewing the image read in said image reading step;
a determining step of determining whether a destination of the data of the image generated in said image reading step includes a predetermined storage of the image reading apparatus;
a first control step of generating a preview image based on the data of the image generated in said image reading step in a case where the instruction has been received in said receiving step, the preview image allowing an operator to preview the image read in said image reading step;
a second control step of generating the preview image without receiving the instruction based on the data of the image generated in said image reading step to display the preview image in accordance with the instruction received after generating the preview image, in a case where the instruction has not been received in said receiving step and said determining step determines that the destination includes the predetermined storage, the preview image being stored in the predetermined storage of the image reading apparatus and allowing an operator to preview the image read by said image reading unit; and
a third control step of not generating the preview image in a case where the instruction has not been received in said receiving step and said determining step determines that the destination does not include the predetermined storage.

13. A method according to claim 12, further comprising:
a display control step of displaying the preview image generated in said first control step on a display unit in accordance with the instruction received after generating the preview image.

14. A method according to claim 12, further comprising:
a designation accepting step of accepting a designation of the data of the image generated in said image reading step; and
a storage controlling step of storing the data of the image generated in said image reading step and the preview image generated in said first or second control step in a storage unit corresponding to the predetermined storage in a case where the designation accepted in said designation accepting step includes a designation of the storage unit.

15. A method according to claim 14, further comprising:
a transmitting step of transmitting the data of the image generated in said image reading step to a predetermined apparatus other than the storage unit in a case where the designation accepted in said designation accepting step does not include the designation of the storage unit, but includes a designation of the predetermined apparatus.

16. A method according to claim 15, further comprising:
a stopping step of stopping operation of the first or second control step in a case where the designation accepted in said designation accepting step does not include the designation of the storage unit, but includes the designation of the predetermined apparatus.

17. A non-transitory computer-readable medium storing a computer program for an image reading apparatus, the computer program comprising:
an image reading module for reading an image and generating data of the image with an image reading unit;
a receiving module for receiving an instruction for previewing the image read by said image reading unit;
a determining module for determining whether a destination of data of the image generated by said image reading module includes a predetermined storage of the image reading apparatus; and
a control module for:
generating a preview image based on the data of the image generated by said image reading unit in a case where the instruction has been received by said receiving module, the preview image allowing an operator to preview the image read by said image reading unit;
generating the preview image without receiving the instruction based on the data of the image generated by said image reading unit to display the preview image in accordance with the instruction received after generating the preview image, in a case where the instruction has not been received and said determining module determines that the destination includes the predetermined storage, the preview image being stored in the predetermined storage of the image reading apparatus and allowing an operator to preview the image read by said image reading unit; and
not generating the preview image in a case where the instruction has not been received and said determining module determines that the destination does not include the predetermined storage.

18. An image reading apparatus comprising:
an image reading unit configured to read an image and generate data of the image;
a receiving unit configured to receive an instruction for previewing the image read by said image reading unit;
a determining unit configured to determine whether the data of the image generated by said image reading unit is stored in a predetermined storage of the image reading apparatus or is transmitted to an external apparatus; and
a control unit configured to:
generate a preview image based on the data of the image generated by said image reading unit in a case where the instruction has been received by said receiving unit, the preview image allowing an operator to preview the image read by said image reading unit;
generate the preview image without receiving the instruction based on the data of the image generated by said image reading unit to display the preview image in accordance with the instruction received after generating the preview image, in a case where the instruction has not been received by said receiving unit and said determining unit determines that the data of the image generated by said image reading unit is stored in the predetermined storage of the image reading apparatus, the preview image being stored in the predetermined storage of the image reading apparatus and allowing an operator to preview the image read by said image reading unit; and
not generating the preview image in a case where the instruction has not been received by said receiving unit and said determining unit determines that the data of the image generated by said image reading unit is transmitted to the external apparatus.

* * * * *